April 17, 1956  C. H. SATTERLEE ET AL  2,742,296
CHUCK

Filed Feb. 13, 1953  2 Sheets-Sheet 1

INVENTORS
CHARLES H. SATTERLEE
ROBERT E. STARK
BY
Richard W. Treverton
ATTORNEY

April 17, 1956  C. H. SATTERLEE ET AL  2,742,296
CHUCK

Filed Feb. 13, 1953  2 Sheets-Sheet 2

INVENTORS
CHARLES H. SATTERLEE
BY ROBERT E. STARK

*Richard W. Treverton*
ATTORNEY

United States Patent Office 2,742,296
Patented Apr. 17, 1956

2,742,296
CHUCK

Charles H. Satterlee, Rochester, and Robert E. Stark, Pittsford, N. Y., assignors to The Gleason Works, Rochester, N. Y., a corporation of New York Application February 13, 1953, Serial No. 336,718

7 Claims. (Cl. 279—2)

The present invention relates to an expanding collet chuck adapted to simultaneously grip inner and end surfaces of a workpiece to accurately position it both radially and axially for a machining operation.

The chuck comprises a body having a forwardly extending rim within which an expander is slidable axially. The expander may function as a pilot or guide means when mounting the work on the chuck, and with the rim defines an annular recess around the chuck immediately forward of the rim. In this recess there is disposed a collet which is expansible radially to grip the inner surface of the work when the collet is compressed axially by rearward sliding motion of the expander. A clamp member is engageable with an end surface of the work to draw the work against the front face of the rim. This clamp member is detachably connected to rods which parallel the chuck axis and extend through aligned openings through the expander and the rim. The rods are carried by the arms of a spider that is movable axially within the body. A flanged actuator movable along the axis of the chuck acts through load-dividing levers to simultaneously urge both the spider and expander rearwardly, to thereby draw the work against the rim and expand the collet to grip the inner surface of the work. The levers are disposed radially of and distributed about the chuck axis, and their outer and inner ends respectively engage the expander and the hub of the spider.

The arrangement of parts provides a compact arrangement in which the axial spacing of the work, from the spindle of the machine on which the chuck is mounted, is reduced to a minimum. The work is positively positioned, both axially and radially, thereby adapting the chuck for machining operations in which extreme accuracy is required.

The foregoing and other objects and advantages of the invention will appear from the following detailed description made with reference to the drawings, wherein.

Figure 5:
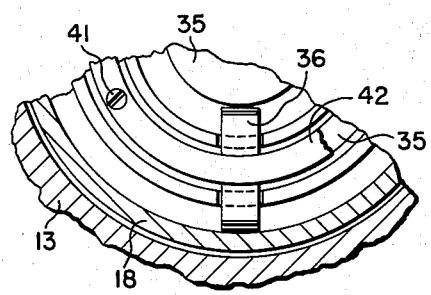
Figure 3:
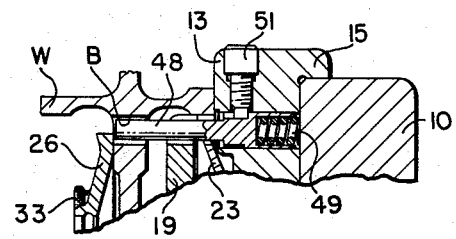
Figure 1:
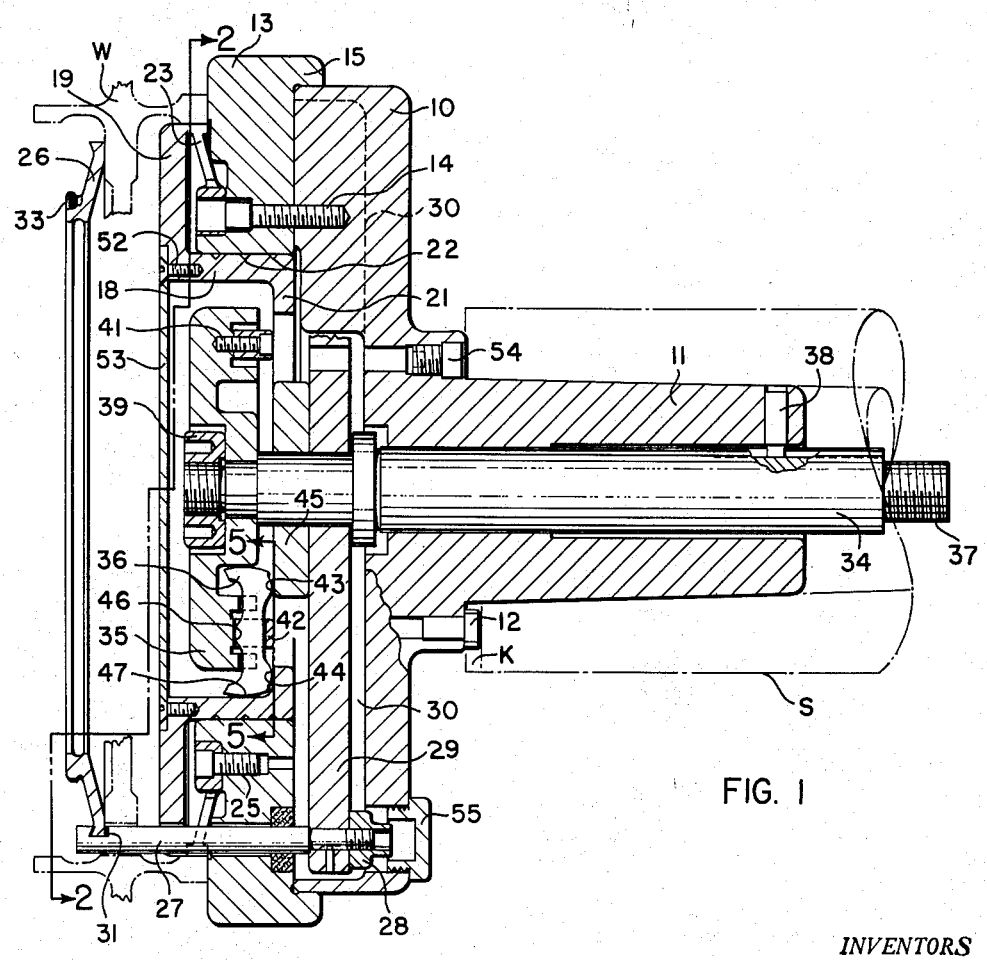
Fig. 1 is an axial section through the chuck in the planes indicated by section line 1—1 of Fig. 2.
Figure 2:
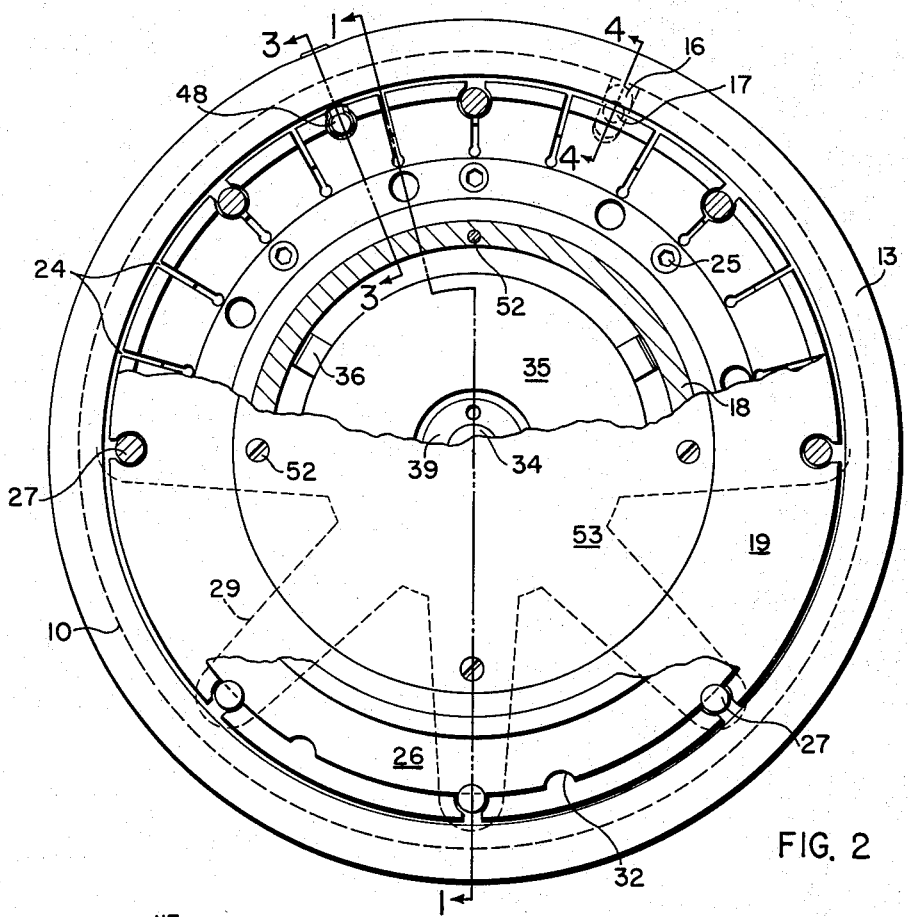
Fig. 2 is a front elevational and transverse sectional view taken approximately in the planes indicated by section line 2—2 of Fig. 1.
Figure 6:
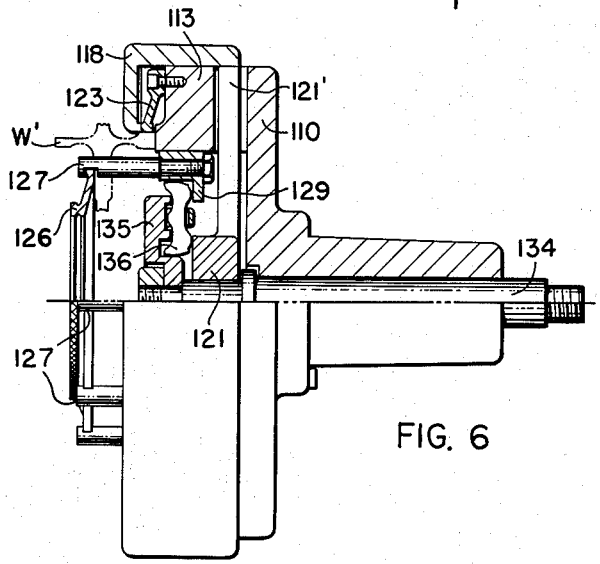
Figure 4:
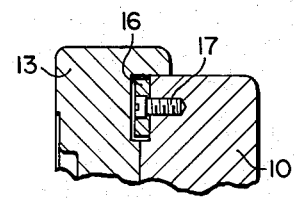

Figs. 3 and 4 are fragmentary axial sectional views taken in the respective planes indicated by section lines 3—3 and 4—4 of Fig. 2;

Fig. 5 is a fragmentary transverse sectional view taken approximately as indicated by section line 5—5 of Fig. 1; and Fig. 6 is a diagrammatic axial sectional view, through a modified form of chuck.

The chuck illustrated in the drawings comprises a rear body section 10 having a tapered shank 11 that is adapted to fit into the tubular work spindle S of a machine, such, for example, as a clutch tooth cutting or grinding machine, this spindle appearing in broken lines in Fig. 1. A key 12 on the shank seats in a keyway K of the spindle to cause the chuck to rotate as a unit with the spindle. A forward body section 13 is secured to section 10 by screws 14 and constitutes a forwardly extending rim of the chuck body. Section 13 has a rearwardly projecting flange 15 which serves to maintain the rim concentric with the chuck axis, while a key 16 positions it angularly about that axis relative to the body section 10. As shown in Fig. 4 the key is secured to the section 10 by a screw 17.

Slidable axially within the cylindrical inner surface of the rim is an annular expander 18 having an outer flange 19 and an inner flange 21. Annular grooves 22 on the cylindrical surface of member 18 are adapted to be packed with a suitable lubricant. The flange 19 preferably has its forward outer edge rounded to enable it to function as a pilot or guide for a workpiece W being chucked. The rear face of the flange together with the forward face of rim 13 defines an annular groove around the chuck in which is disposed an annular collet 23 that is adapted to be expanded to grip the adjacent bore of the work W.

The collet 23 has inner and outer rims connected by a relatively thin and flexible web. Its flexibility is increased by slots 24 which extend in a radial direction through the outer rim and the web. The inner rim of the collet is secured to rim 13 of the body by screws 25, while the outer rim of the collet abuts the flange 19 of the expander. As shown in Fig. 1, the web of the collet is of frusto-conical form, inclining forwardly from its inner rim to its outer rim. As a result when the outer rim of the collet is moved rearwardly it is also moved radially, to thereby grip the bore of the workpiece. Upon release of the pressure exerted by the expander the resilience of the web of the collet returns the collet rim and the expander to their forward positions wherein the grip on the bore of the workpiece is released. As shown the cone angle of the web, i. e. the angle which it makes with the axis of rotation of the chuck, is greater than forty-five degrees, with the result that the radial expansion of the outer rim of the collet is less than the relative axial motion of the inner and outer rims of the collet. Accordingly the force exerted by the outer rim in a radial direction is greater than the force applied to it in an axial direction.

For drawing the workpiece tightly against the front face of rim 13 an annular clamp member 26 is provided to bear upon a front face of the workpiece. This member is detachably connected to draw rods 27 which are secured by nuts 28 to the arms of a spider 29, that is disposed in a spider shaped recess 30 in body section 10. The spider 29 has one arm for each draw rod 27, and several of these arms appear in dotted lines in Fig. 2. The rods extend through aligned openings in rim 13, collet 23, flange 19 of the expander and the workpiece. At their forward ends the rods have notches 31 to receive the rim of clamp member 26. The latter has peripheral notches 32, and is attached to the rods by moving it to pass these notches over the rods and then rotating it through a small angle. Such attachment, and subsequent detachment, is facilitated by provision of a knurled hand-grip portion 33 on the member 26.

At the center of the chuck there is a draw rod 34 carrying at its forward end a flange member 35 and a plurality of rockers or levers 36, the latter being arranged to transmit rearward motion of the rod 34 to the expander 18 and the spider 29. The draw rod is threaded at 37 for connection to a suitable chuck operating mechanism, such as a hydraulically operated piston (not shown). A keyway in the draw rod receives a key 38 secured to shank 11 to hold the rod against rotation in chuck body 10, 13. The flange member 35 is secured to the actuator rod 34 by a nut 39, and joined to it by screws 41 is a retainer ring 42 for levers 36. Radial slots in the rear face of the flange member 35 and in the forward face of ring 42 receive the levers and keep them in radial relationship to the chuck axis. The outer and inner ends of the levers have bulges 43 and 44 respectively engaging flange 21 of the expander and a collar 45 which is in effect a part of the hub of spider 29, although for convenience of manufacture it is made as a separate part. The spider and the collar are slidably supported by the draw rod 34. A bulge 46 intermediate of the ends of each lever 36 serves as a rocking fulcrum for the lever, bearing for this purpose upon the front face of the flange member 35. The levers are held against substantial displacement radially of the chuck by abutment of their rounded end faces 47 with the hub of member 35 and the inner surface of expander 18.

For locating the workpiece about the axis of the chuck, it is provided with a bore B and the chuck with a pin 48 having a tapered nose for seating in this bore. The pin is slidable in an opening in rim 13 and is urged forwardly to seated position by a spring 49. A key 51 carried by rim 13 engages in a keyway in the pin to hold it against rotation.

Detachably secured by screws 52 to the expander 18 is a protective closure plate 53. When the chuck is to be removed from the spindle S this plate and the flange member 35 are first removed to gain access to a jack screw 54 which is screw threaded to the chuck body and may be turned by a suitable wrench to loosen the tapered shank 11 from the spindle. Screw caps 55 are removable from the body section 10 to provide access to nuts 28, so that the rods 27 may be replaced without complete dissassembly of the chuck.

In using the chuck, assuming that it is mounted on a suitable spindle S, a workpiece W is positioned as shown in Fig. 1, being guided into place by the rounded edge of flange 19 sliding in the workpiece bore until the front face of the workpiece abuts the rim 13; and being further guided by the tapered nose of the pin 48 seating itself in the bore B. Next the clamp plate 26 is attached to rods 27 in the manner previously described. The draw rod 37 is then pulled rearwardly by means attached to its threaded end 37. The force thus applied to the draw rod is divided by the levers 36 which apply approximately half of it to the spider 29 and half of the expander 18 regardless of the distances which they move. The equalizing action thus provided by the levers allows the spider, and the rods 27 and clamp member 26, to move rearwardly any distance that is necessary to pull the workpiece solidly against rim 13. The equalizing action also allows the pull on draw bar 34 to move the expander 18 and the outer rim of collet 23 rearwardly whatever distance is necessary to expand the collect radilly into firm clamping relationship with the bore of the workpiece which it engages.

The machine then may be operated, as for example to cut or grind teeth in exposed end face of the workpiece. After this is completed the work is dechucked by first releasing the pull on draw bar 34. The inherent resiliency of the web of collet 23 causes its outer rim to spring forwardly, reflecting the grip of this rim on the workpiece. The clamp member 26 may then be detached from rods 27 and the workpiece lifted from the chuck.

The chuck shown in Fig. 6 differs from that shown in Figs. 1 to 5, inclusive, primarily in that its expansible collet is adapted to grip an exterior surface of the work instead of an internal surface. As shown, the chuck body 110 has a forwardly extending rim 113 upon whose front face the workpiece W' seats. The expander, 118, slides on the external surface of the rim and has an inwardly directed flange which serves as a pilot or guide when inserting the workpiece in the chuck, and which is moved rearwardly on the chuck body to expand a collet 123 to grip the workpiece. The collet is seated in an annular groove formed between the flange of the expander and the rim 113, and it is similar to collet 23 except that its exterior rim is secured to rim 113 and its interior rim grips the workpiece, and that it expands radially inwardly instead of radially outwardly when it is compressed axially.

A clamp member 126 for pressing against a front face of the workpiece is detachably connected to rods 127 carried by a member 129 that is slidable axially of the chuck on the inner surface of rim 113. A spider 121 is slidably mounted on the draw rod, 134, and has its radially extending arms 121' secured to the expander 118. Secured to the forward end of the draw rod is a flange member 135 upon which levers 136 are fulcrumed intermediate of their ends. The outer and inner ends of the levers bear respectively upon spider 121 and member 129. When the draw rod 134 is pulled rearwardly, pressure is applied through flange member 135, the levers 136, ring 129, rods 127 and clamp member 126 to firmly clamp the workpiece against the front face of rim 113. Simultaneously pressure is exerted through levers 136, spider 121 and expander 118 to move the inner rim of collet 123 rearwardly and thereby expand the latter radially inwardly to firmly clamp the exterior surface of the workpiece.

In the two illustrated embodiments of the invention the levers, 36 and 136, are designed to divide the force exerted by the draw rods, respectively 34 and 134, equally between the collet expander and the clamp member. Thus in Fig. 1 the fulcrum bulges 46 are at the centers of levers 36, i. e. are equally distant from bulges 43 and 44, with the result that half of the pull exerted by draw rod 34 is applied to the collet expander 18 and the other half is applied through members 45, 29 and 27 to the clamp member 26. However this proportion may be varied as desired by changing the location of the fulcrum bulges on the levers. For example if the bulge 46 on each lever 36 is located nearer to bulge 44 than to bulge 43, then a greater proportion of the force of the draw bar 34 will be applied to the expander 18 and a smaller proportion to the clamp member 26.

The foregoing disclosure is made by way of illustration and example, and not by way of limitation, it being understood that various changes may be made in the form and arrangement of the parts of the chuck without departing from the spirit of our invention or from the scope of the appended claims.

We claim:

1. A chuck comprising a body having a forwardly extending rim, an expander slidable axially relative to the body and having a portion forward of said rim for defining therewith an annular recess, a radially expansible collet in said recess, said collet being adapted to expand radially upon axial compression thereof, a plurality of rods spaced around the chuck axis, a clamp member detachably secured to the forward ends of said rods, a part movable axially within the body and joined to the opposite ends of said rods, a plurality of radially disposed levers spaced about the chuck axis, and having their opposite ends arranged to exert pressure respectively upon the expander and the rod carrying part, and an actuating member movable axially of the chuck and fulcruming said levers intermediate of their ends, inward motion of said actuating member acting through the levers, the rod carrying part and the rods to urge the clamp member toward the rim of the body and acting through the levers and the expander to compress the collet axially to thereby expand it radially.

2. A chuck according to claim 1 in which the collet is adapted to expand radially outwardly upon axial compression thereof and to grip an inside surface of the workpiece, and the circularly arranged rods extend through aligned openings in the expander and in the rim of the body.

3. A chuck according to claim 2 in which the expander is of substantially annular shape and has an outside diameter approximately equal to that of the collet whereby it may function as a guide for the bore of work being chucked.

4. A chuck according to claim 2 in which the expander has a cylindrical surface slidable on the inner surface of the rim of the body.

5. A chuck comprising a body, an expander slidable axially relative to the body, said expander having a portion spaced axially from a face of said body and defining with said face an annular recess, and a radially expansible collet in said recess, said collet comprising a relatively thin web of frusto-conical form having relatively heavy integral inner and outer rims, one rim being secured to said face of the body and the other rim having one face abutting the expander and another of cylindrical shape for engaging a cylindrical surface of a workpiece, and said collet having radial slots extending through said other rim and said web.

6. A radially expansible collet for a chuck, comprising a relatively thin and flexible web of frusto-conical form having relatively heavy, rigid and integral inner and outer rims, the flexibility of the web enabling the rims to be shifted axially relative to each other, at least one rim having a substantially cylindrical surface for engaging a workpiece and an adjacent end face for sliding engagement with a part of the collet upon radial motion of said one rim resulting from relative axial motion of the rims, said one rim and said web having radial slots therethrough, and the cone angle of the web being such that the relative axial motion of the rims is greater than said resulting radial motion.

7. A chuck comprising a collet having a relatively thin and flexible web of frusto-conical form having relatively thick, rigid and integral inner and outer rims, the cone angle of the web as measured from the axis of the collet being greater than forty-five degrees, the web and one rim having radial slots therethrough, the flexibility of the web enabling said rims to be shifted axially relative to each other, said one rim having a substantially cylindrical surface for engaging a workpiece and an adjacent end face, and the chuck further comprising a pair of members movable axially relative to each other and respectively engaging said inner and outer rims to effect said relative axial shifting of the rims, one of the members of said pair having a sliding engagement with said adjacent surface.

References Cited in the file of this patent

UNITED STATES PATENTS

| | | |
|---|---|---|
| 261,887 | Whitney | Aug. 1, 1882 |
| 446,549 | Russell | Feb. 17, 1891 |
| 1,320,660 | Thompson | Nov. 4, 1919 |
| 1,830,649 | Evans | Nov. 3, 1931 |
| 2,453,262 | Peters | Nov. 9, 1948 |